(12) United States Patent
Sugawara

(10) Patent No.: US 8,265,476 B2
(45) Date of Patent: *Sep. 11, 2012

(54) IMAGING APPARATUS

(75) Inventor: Wataru Sugawara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 13/168,230

(22) Filed: Jun. 24, 2011

(65) Prior Publication Data

US 2011/0249962 A1  Oct. 13, 2011

Related U.S. Application Data

(63) Continuation of application No. 12/704,774, filed on Feb. 12, 2010, now Pat. No. 7,991,284.

(30) Foreign Application Priority Data

Feb. 10, 2009 (JP) ................................. 2009-028047

(51) Int. Cl.
*G03B 13/04* (2006.01)
*H04N 5/76* (2006.01)
(52) U.S. Cl. ..................................... 396/310; 348/231.5
(58) Field of Classification Search ................... 396/310; 348/231.5
See application file for complete search history.

(56) References Cited

U.S. PATENT DOCUMENTS

| 7,991,284 | B2 * | 8/2011 | Sugawara | 396/310 |
| 2005/0041117 | A1 | 2/2005 | Yamagishi | |
| 2006/0227223 | A1 * | 10/2006 | Nagata | 348/231.5 |
| 2007/0291136 | A1 * | 12/2007 | Wakabayashi | 348/231.99 |
| 2008/0068469 | A1 * | 3/2008 | Takagi et al. | 348/231.2 |

FOREIGN PATENT DOCUMENTS

| JP | 2006-262128 A | 9/2006 |
| JP | 2007-293385 A | 11/2007 |
| JP | 4223387 B2 | 11/2008 |

* cited by examiner

*Primary Examiner* — Rochelle-Ann J Blackman
(74) *Attorney, Agent, or Firm* — Dickstein Shapiro LLP

(57) ABSTRACT

An imaging apparatus includes a present date and time information obtaining device to obtain present date-time information at a time performing a present photographing operation, a last date-time information recording device to record last date-time information at a time performing a last photographing operation, an image number counting device to compare the present and last date-time information when performing the present photographing operation and to newly count a number of photographed subject images when the present date-time information is not within the predetermined period from the last date-time information and to continuously count the number of photographed subject images when the present date and time information is within the predetermined period from the last date-time information, and a displaying unit having an exit screen displayed when the imaging apparatus is turned off and to display the number of the photographed subject images on the exit screen.

9 Claims, 6 Drawing Sheets

NUMBER OF IMAGES ON DAILY BASIS

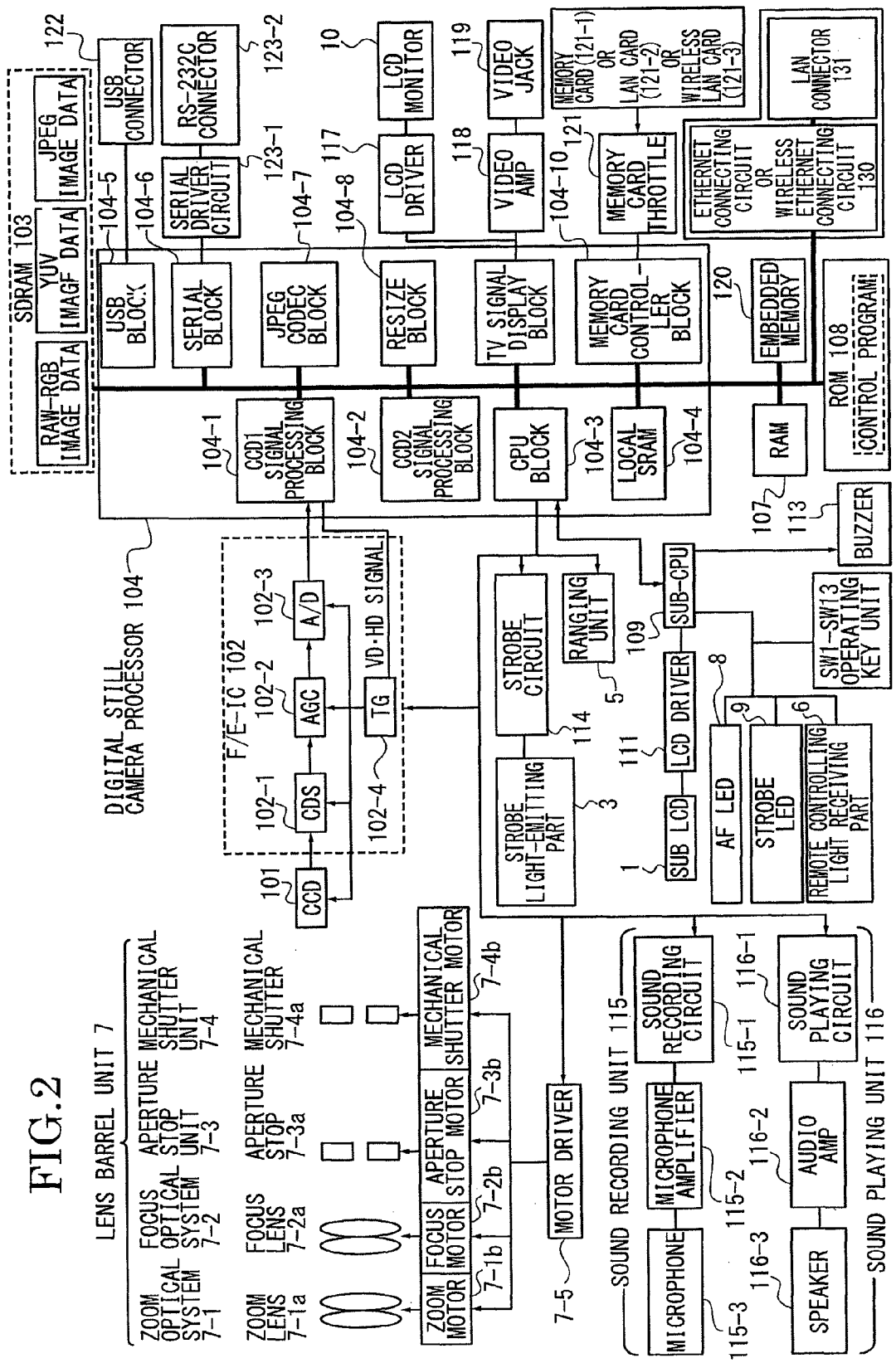

FIG.3

| R | G | R | G | R | G | ······ |
|---|---|---|---|---|---|--------|
| G | B | G | B | G | B | ······ |
| R | G | R | G | R | G | ······ |
| G | B | G | B | G | B | ······ |
| R | G | R | G | R | G | ······ |
| G | B | G | B | G | B | ······ |
| R | G | R | G | R | G | ······ |
| G | B | G | B | G | B | ······ |
| . | . | . | . | . | . | |
| . | . | . | . | . | . | |

NUMBER OF IMAGES ON DAILY BASIS

NUMBER OF IMAGES ON WEEKLY BASIS

NUMBER OF IMAGES ON MONTHLY BASIS

NUMBER OF IMAGES FROM BEGINNING TO PRESENT TIME

DISPLAY CALENDAR

DISPLAY GRAPH

IMAGING APPARATUS

CROSS REFERENCE TO RELATED APPLICATIONS

This application is a continuation of application Ser. No. 12/704,774, filed Feb. 12, 2010, now U.S. Pat. No. 7,991,284 which is based on and claims priority from Japanese Application Number 2009-028047, filed on Feb. 10, 2009, the disclosures of which are hereby incorporated by reference herein in their entirety.

BACKGROUND OF THE INVENTION

1. Field of the Invention

The present invention relates to an imaging apparatus which is preferable to evaluate a number of photographed subject images.

2. Description of the Related Art

Most of imaging apparatuses such as a digital camera, and the like include functions for obtaining date and time information when photographing, storing the date and time information by associating with photographed image data and displaying the photographed image with the date and time information when photographing the subject image.

Here, a user of the imaging apparatus, specifically, a shutter bug, a novice photographer or the like is intended to photograph a number of subject images photographed every day or within a predetermined period as training. Such a user wants to confirm the number of the photographed subject images each day.

On the other hand, for example, Japanese Patent Application Publication No. 2006-262128 discloses a digital camera which is configured to display the number of the subject images photographed at the date if a mode (subject image number display mode) for displaying the number of photographed subject images is selected. Japanese Patent Application Publication No. 2007-293385 discloses a technology relating to an image search process in an image processing apparatus having an image database.

However, in the technology disclosed in Japanese Patent Application Publication No. 2006-262128, there is a problem in that it is necessary to switch modes to select the subject image number display mode to confirm the number of the photographed subject images, that is, the user is required to perform an operation of switching the modes. Furthermore, in the technology disclosed in Japanese Patent Application Publication No. 2007-293385, there is a problem in that the user is required to perform operation of selecting an "image search" menu from a menu screen.

SUMMARY OF THE INVENTION

An object of the present invention is to provide an imaging apparatus capable of easily confirming a number of photographed subject images by displaying the number of the subject images photographed within a predetermined period on an exit screen displayed when a power of the imaging apparatus is turned off without other operations such as an operation for switching modes by the user.

To achieve the above object, an imaging apparatus according to an embodiment of the present invention includes a date and time information setting device configured to set date and time information, a present date and time information obtaining device configured to obtain present date and time information at a time performing a present photographing operation to photograph a present subject image, a last date and time information recording device configured to record last date and time information at a time performing a last photographing operation to photograph a last subject image, a subject image number counting device configured to compare the present and last date and time information to judge whether or not the present date and time information is within a predetermined period from the last date and time information when performing the present photographing operation and to reset and newly count a number of photographed subject images when it is judged that the present date and time information is not within the predetermined period from the last date and time information and to continuously count the number of photographed subject images when it is judged that the present date and time information is within the predetermined period from the last date and time information, and a displaying unit having an exit screen displayed when the imaging apparatus is turned off and configured to display the number of the photographed subject images, which is counted by the subject image number counting device on the exit screen.

BRIEF DESCRIPTION OF THE DRAWINGS

FIG. 2 is a block diagram illustrating an example of an internal configuration of the imaging apparatus according to the present invention.

FIG. 3 is a schematic view illustrating an example of a solid-state image sensing device of the imaging apparatus according to the present invention.

DETAILED DESCRIPTION OF THE PREFERRED EMBODIMENTS

Preferred embodiments of the present invention will be explained in detail hereinafter with reference to the accompanying drawings.

FIGS. 1A to 6 illustrate embodiments of an imaging apparatus of the present invention.

The imaging apparatus is, for example, used as a digital still camera ("digital camera", hereinbelow).

Figure 1A:
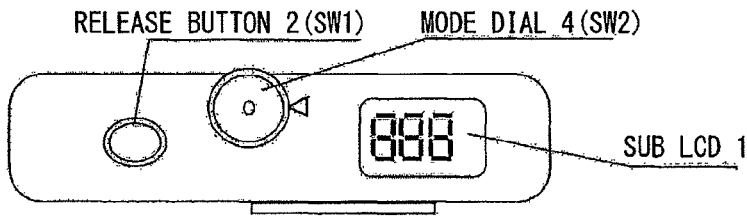
FIG. 1A is a top view illustrating an example of a digital camera according to an imaging apparatus of the present invention.
Figure 1B:
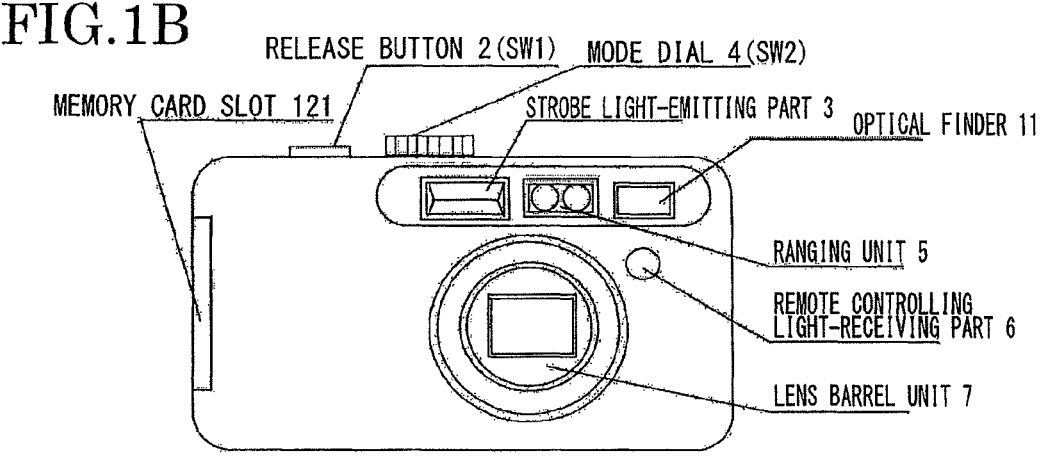
FIG. 1B is a front view illustrating the camera shown in FIG. 1A.
Figure 1C:
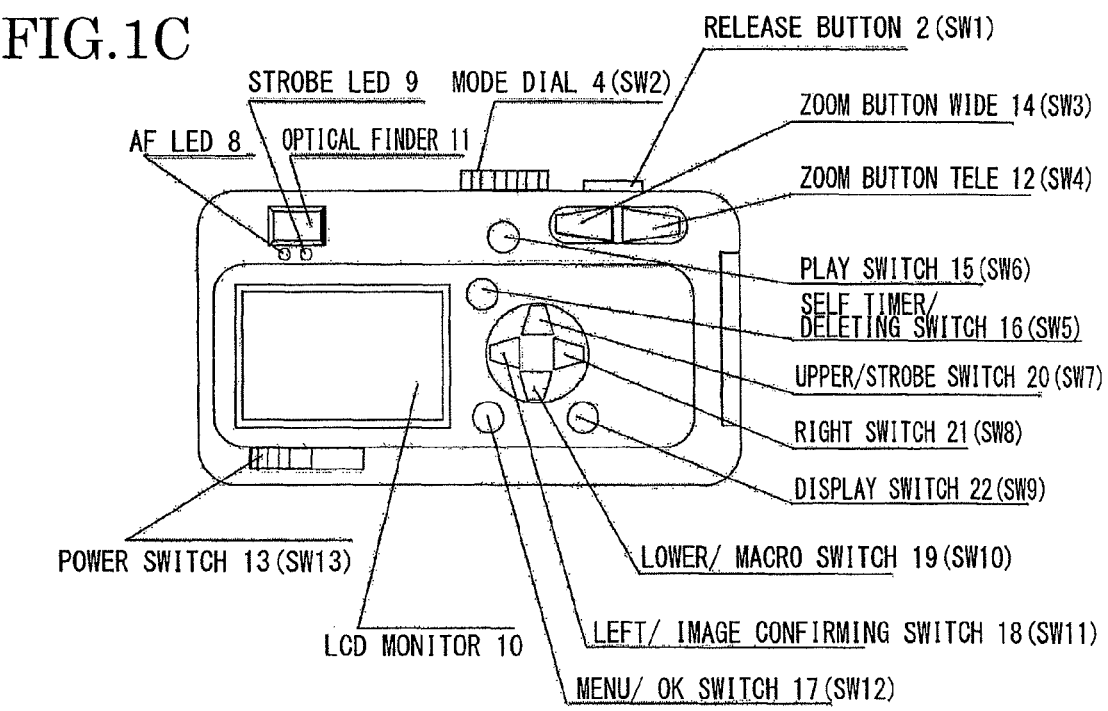
FIG. 1C is a back view illustrating the camera shown in FIG. 1A.

FIGS. 1A to 1C schematically shows configurations of the digital camera. As shown in FIG. 1A, the digital camera has a camera body having an upper surface, and a sub LCD 1, a shutter button 2 (SW1), and a mode dial 4 (SW2) are provided on the upper surface of the camera body.

As shown in FIG. 1B, the camera body has a front surface and a strobe light emitting part 3, a ranging unit 5, a remote controlling light-receiving part 6, a lens barrel unit 7, and an optical finder (front side) 11 are provided on the front surface of the camera body. A memory card slot 121 is for inserting therein a memory card 121-1 and provided on a side surface of the camera body. The memory card 121-1 may be a LAN card 121-2, a wireless LAN 121-3, and the like as needed.

As shown in FIG. 1C, a rear surface of the camera body is provided with an AFLED (autofocus LED) 8, a strobe LED 9, a displaying device or a liquid-crystal display (LCD) monitor 10 to display, for example, a subject image imaged by an imaging device, the optical finder (rear side) 11, a zoom button TELE12 (SW4), a power switch 13 (SW 13), a zoom button WIDE 14 (SW3), and a play switch 15 (SW6).

Furthermore, the rear surface of the camera body is provided with a self timer/deleting switch 16 (SW5), a menu/OK switch 17 (SW12), a left/image confirming switch 18 (SW11), a lower/macro switch 19 (SW10), an upper/strobe switch 20 (SW7), a right switch 21 (SW8), and a display switch 22 (SW9) for displaying an image.

Next, an internal configuration of the digital camera will be explained with reference to FIG. 2.

Inside of the camera body, the strobe light-emitting part 3 and a strobe circuit 114 are provided and configured to compensate light amount when light such as natural light is insufficient. When imaging in a dark place or imaging a dark subject, a strobe light-emitting signal is transmitted from a digital signal processor 104 to the strobe circuit 114. The strobe circuit 114 is configured to allow the strobe light-emitting part 3 to emit light so that the subject is illuminated.

The ranging unit 5 is configured to measure a distance between the camera body and the subject. In general, in the digital camera, a CCD-AF system is used, in which contrast of an image formed on an imaging element (CCD) is detected and a lens is moved to a position where the highest contrast is obtained to be focused on the subject. However, in such a CCD-AF system, the contrast is searched while the lens is moved in small steps and therefore there is a problem in that a focusing operation requires time. Accordingly, information on a distance from a subject is constantly obtained by using the ranging unit 5 and the lens is moved at one based on the obtained distance information so that a high speed focusing operation can be achieved. The remote controlling light-receiving part 6 receives an infrared signal from outside.

The lens barrel unit 7 includes a zoom optical system 7-1 having a zoom lens 7-1a taking in an optical image of the subject and a zoom driving motor 7-1b, and a focus optical system 7-2 having a focus lens 7-2a and a focus driving motor 7-2b. The lens barrel unit 7 also includes an aperture stop unit 7-3 having an aperture stop 7-3a and an aperture stop motor 7-3b, a mechanical shutter unit 7-4 having a mechanical shutter 7-4a and a mechanical shutter motor 7-4b, and a motor driver 7-5 for driving each motor.

The motor driver 7-5 is controlled to be driven by a driving command from a CPU block 104-3 provided in the digital signal processor 104 based on an operational input of the remote controlling light-receiving part 6 and the operating part Key unit (SW1 to SW13).

In the ROM 108, a control program, a control parameter, and the like, which are described by codes readable with the CPU block 104-3 are stored. If a rewritable flash ROM is used as the ROM 108, it is possible to change the control program and the control parameter so that version upgrade of functions, or the like can be easily made.

When the power of the digital camera is made ON, the CPU block 104-3 controls operations in each part of the apparatus based on the control program and stores temporarily data, which are necessary to control the operations in each part, in the RAM 107 and a Local SRAM 104-4 in the digital processing processor 104.

An imaging device such as a CCD 101 configured to image a subject image is, for example, formed by a solid-state image sensing device which is for performing photoelectric conversion to an optical image. As shown in FIG. 3, RGB primary color filter ("RGB filter", hereinafter) of the Bayer arrangement is disposed on a plurality of pixels forming the CCD 101 and therefore electric signals ("analog RGB image signals", hereinafter) each corresponding to one of the primary three colors are output from each pixel of the CCD 101.

A F/E (front/end)-IC 102 includes a CDS 102-1 for conducing a correlating double sampling for removing a noise of the image, an AGC (automatic gain control) 102-2 or conducting gain adjustment, and an A/D102-3 for conducting a digital signal conversion. The F/E-IC 102 also includes a timing generator (hereinafter referred to as "TG") 102-4, to which a vertical synchronous signal (hereinafter referred to as VD) and a horizontal synchronous signal (hereinafter referred to as HD) is supplied from a CCD signal processing block 104-1, and which generates a driving timing signal for the CCD 101 and the F/E-IC 102 controlled by the CPU block 104-3.

The digital signal processor 104 (referred also to as "CPU 104", hereinafter) includes the first CCD signal processing block 104-1 which performs white balance and gamma setting on output data of the F/E-IC 102 and supplies the VD signal and the HD signal to the CCD 101 and the F/E-IC 102, a second CCD signal processing block 104-2 which converts the output data of the F/E-IC 201 into brightness data and color difference data by filtering process, the CPU block 104-3 which controls the operations in each part of the apparatus, the Local SRAM 104-4 which stores temporarily the data required to control the operations, a USB block 104-5 which conducts USB communication with external devices such as a personal computer, a serial block 104-6 which conducts a serial communication with the external devices such as the personal computer, a JPEG CODEC block 104-7 which performs JPEG compression and extension, a RESIZE block 104-8 which performs expansion/reduction of a size of an image data by interpolating process, a TV signal display block 104-9 which converts the image data into a video signal for displaying the image on an external display devices such as an LCD monitor, a TV, or the like, and a memory card controller block 104-10 which controls a memory card for storing the image data in which the photographed image data.

The SDRAM 103 stores temporarily image data when performing each process to the image data in the digital signal processor 104. The image data to be stored is, for example, sent via the F/E-IC 102 from the CCD 101 and may be "RAW-RGB image data" which is obtained by conducting the white balance and gamma setting in the first CCD signal processing block 104-1, "YUV image data" which is obtained by performing the brightness data or color difference data conversion in the second CCD signal processing block 104-2, and/or "JPEG image data" which is obtained by performing JPEG compression in the JPEG CODEC block 104-7.

The memory card slot 121 is a slot to which a detachable memory card is attached. An embedded memory 120 is a memory for storing imaged image data even when a memory card is not attached to the memory card slot 121.

An LCD driver 117 is a drive circuit to drive the liquid-crystal display monitor 10 and has a function for converting a video signal output from the TV signal display block 104-9 into a signal for displaying on the liquid crystal display monitor 10. The liquid-crystal display monitor 10 is a displaying unit to monitor a state of the subject before imaging, to confirm the photographed image, and/or to display the image data stored in the memory card 121 or the embedded memory 120.

A video AMP 118 is an amplifier to convert the video signal output from the TV signal display block 104-9 into impedance of 75☐. A video jack 119 is a jack for connecting the digital camera to an exterior displaying device such as a TV. A USB connector 122 is a connector for conducting a USB connection of the digital camera with an exterior device such as a personal computer and so on.

A serial driver circuit 123-1 is a circuit for performing voltage conversion of an output signal from the serial block 104-6 in order to conduct a serial communication of the digital camera with an external device such as a personal computer or the like. An RS-232C connector 123-2 is a connector for conducting a serial communication of the digital camera with an external device such as a personal computer or the like.

A sub CPU 109 is a CPU in which a ROM and RAM are loaded in one chip and which outputs an output signal from the above-mentioned operating Key unit (SW1 to SW13) or the remote controlling light-receiving part 6 to the CPU block 104-3 as operational information of a user, or outputs a state of the camera output from the CPU block 104-3 by converting the state into a control signal of the sub LCD 1, the AF LED 8, the strobe-LED 9 and a buzzer 113.

The sub LCD 1 is a displaying device for displaying, for example, a limit number of subject images to be photographed. An LCD driver 111 is a driving circuit for driving the sub LCD 1 based on the output signal from the sub CPU 109.

The AF LED 8 is an LED for displaying a focused state when imaging. The strobe-LED 9 is an LED for displaying a charging state of the strobe. In addition, the AF LED 8 and the strobe-LED 9 may be employed for another displaying use such as displaying a state of memory card access and the like. The operating Key unit (SW1 to SW13) is a Key circuit operated by the user, and the remote controlling light-receiving part 6 is a receiving part for a signal of a remote controlling transmitter operated by the user.

A sound recording unit 115 includes a microphone (sound recording device) 115-3 in which the user inputs a sound signal, a microphone amplifier 115-2 for amplifying the input sound signal, and a sound recording circuit 115-1 for recording the amplified sound signal. A sound playing unit 116 includes a sound playing circuit 116-1 for converting the recorded sound signal into a signal capable of outputting from a speaker 116-3, an audio AMP 116-2 for amplifying the converted sound signal and driving the speaker 116-3, and the speaker 116-3 for outputting the sound signal.

Ethernet (registered mark) connecting circuit (or "wireless Ethernet connecting circuit") 130 and a LAN connector performs communication processes between the digital camera and the external device via a network by using a communication protocol. In a case of the Ethernet connecting circuit, the communication process is performed between the digital camera and the external device via a wired network. In a case of the wireless Ethernet connecting circuit, the communication process is performed between the digital camera and the external device via a wireless network.

Next, operations in the imaging apparatus will be explained.

First, a monitoring operation and a still image photographing operation in the imaging apparatus (digital camera) according to an embodiment of the present invention will be explained. In this digital camera, in a still image photographing mode, the still image photographing operation is performed with the later-described monitoring operation.

When the CPU 104 detects operations of a user turning on the power switch 13 and setting the mode dial 4 to be the photographing mode, the CPU 104 outputs a control signal to the motor driver 7-5 to move the lens barrel unit 7 at a position where the photographing can be performed. The CPU 104 activates or starts up the CCD 101, the F/E-IC 102, the SDRAM 103, the ROM 108, the liquid-crystal display monitor 10, and the like.

When a photographing lens system of the lens barrel unit 7 is directed to the subject, a subject image inputted via the photographing lens system is imaged on a light-receiving surface of each pixel of the CCD 101. An electric signal (an analog RGB image signal) according to the subject image outputted from the CCD 101 is inputted to the first CCD signal processing block 104-1 via the F/E-IC 102 and then converted into a "RAW-RGB image data" in a state where the white balance and gamma settings are performed and stored in the SDRAM 103.

The "RAW-ROB image data" is converted into a "YUV image data" in a state where the brightness and color difference data conversions are performed in the second CCD signal processing block 104-2 and then stored in the SDRAM 103. The "YUV" image data is transmitted to the liquid-crystal display monitor 10 via the TV signal display block 104-9 and the LCD driver 117 so that the photographed image is displayed on the liquid-crystal display monitor 10.

The imaging apparatus according to an embodiment of the present invention includes a date and time information setting device configured to set date and time information, a present date and time information obtaining device configured to obtain present date and time information at a time performing a present photographing operation to photograph a present subject image, a last date and time information recording device configured to record a last date and time information at a time performing a last photographing operation to photograph a last subject image, a subject image number counting device, and a displaying unit having an exit screen displayed when the imaging apparatus is turned off and configured to display the number of the photographed subject images, which is counted by the subject image number counting device on the exit screen. The subject image number counting device is configured to compare the present and last date and time information to judge whether or not the present date and time information is within a predetermined period from the last date and time information when performing the present photographing operation and to reset and newly count a number of photographed subject images when it is judged that the present date and time information is not within the predetermined period from the last date and time information and to continuously count the number of photographed subject images when it is judged that the present date and time information is within the predetermined period from the last date and time information.

In a monitoring operation where the photographed image is displayed on the liquid-crystal display monitor 10, by performing a thinning or skipping process, one frame of the photographed image every ⅓₀ second is read out. In this monitoring operation, the photographed image is only displayed on the liquid-crystal display 10 which functions as an electronic finder but the digital camera is in a state where the shutter button 2 is not yet full-pressed or half-pressed. It is possible for the user to photograph a still image by pressing down the shutter button 2 while confirming an image to be photographed on the liquid-crystal display monitor 10.

Furthermore, the imaging apparatus according to this embodiment may have further photographing functions other than the still image photographing function to photograph a still image by operations of switching photographing modes by switching the mode dial 4.

The imaging apparatus may include a recording device having at least one of a character recording part configured to binarize the subject image and record the binarized subject image and a moving image recording part configured to record a moving image. The subject image number counting device may be configured to count a number of images recorded by the recording device.

For example, the character recording part (recording device) accomplishes a character photographing function for photographing a character. The character photographing function is a preferable function in a case where the subject to be photographed includes a character and the photographed image is binarized in black and white and then stored. The image is binarized so that the character of the subject is clearly judged or recognized. The moving image recording part (recording device) accomplishes a moving image photographing function for photographing a moving image.

The imaging apparatus according an embodiment of the present invention may include a plural image recording device having at least one of a continuously-recording part, a plural size image simultaneously-recording part and a bracket recording part, which are configured to record a plurality of image data upon one request for recording. The subject image number counting device is configured to count a number of images recorded by the plural image recording device.

The continuously-recording part (plural image recording device) accomplishes a continuously-photographing function for continuously photographing plural images. The continuously-photographing function is a function of continuously photographing still images while the shutter button 2 is pressed down. The plural size image simultaneously-recording part (plural image recording device) accomplishes a plural size image simultaneously photographing function for simultaneously photographing a plurality of images having plural sizes. The plural size image simultaneously photographing function is, for example, a function of selecting sizes of an original file and a sub file and thereby simultaneously generating a plurality of photographed images having different sizes from each other by once pressing down the shutter button 2. A bracket recording part (plural image recording device) accomplishes a function of exposure bracket. The exposure bracket function is a function of continuously photographing images having different exposures from each other by once pressing down the shutter button 2, for example, based on a predetermined exposure.

The imaging apparatus according an embodiment of the present invention may include a sound recording device configured to record a sound. The subject image number counting device is configured to count a number of images in a case where the sound is recorded by the sound recording device.

The sound recording device accomplishes a sound recording function. The sound recording function is a function of recording and storing a sound by the sound recording unit 115 but not generating an image. Moreover, the above-described recording devices may be achieved by known or unknown methods and not limited thereto.

[Operation of Counting a Number of Photographed Images]

An imaging apparatus according to an embodiment of the present invention includes a date and time information setting device configured to set and store date and time information (that is, information on date and time of the present time), a present date and time information obtaining device configured to obtain present date and time information when photographing a present subject image and a last date and time information recording device configured to record last date and time information when last photographing a last subject image.

As described below, the imaging apparatus includes the subject image number counting device configured to compare the present date and time information and the last date and time information when photographing the present subject image and count a number of photographed images based on the comparison result and a displaying unit configured to display the number of the photographed subject images, which is counted by the subject image number counting device, in a predetermined display format on an exit screen which is displayed on the LCD monitor 10 as the displaying device when the imaging apparatus is turned off. Functions of Each of the above-described devices may be accomplished by functions of the CPU 104, the RAM 107, ROM 108, the embedded memory 120, the LCD driver 117, the operating Key unit (SW1 to SW13), and the like.

Figure 4:
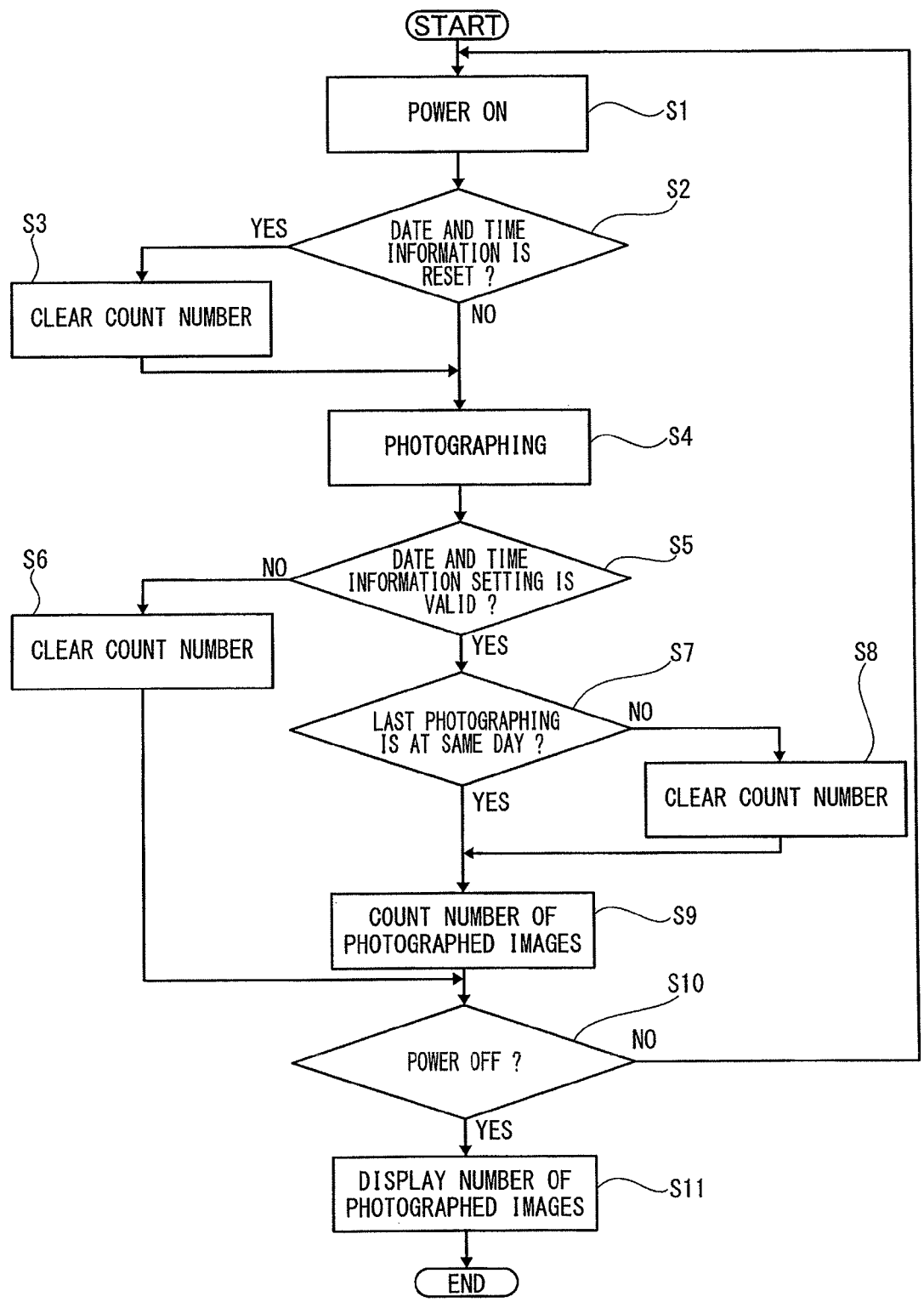
FIG. 4 is a flow chart illustrating an example of operations performed in the imaging apparatus according to the present invention.

FIG. 4 is a flow chart illustrating an example of processes in which the power is turned on, a cumulative number of photographed subject images is counted, the power is turned off, and then a number of photographed subject images for one day is displayed.

When the power of the imaging apparatus is turned on (the power switch 13 is turned on) (S1), it is judged whether or not the date and time information is reset by the date and time information setting device (S2). Here, when the date and time information is reset (S2: Yes), that is, the date and time information of the imaging apparatus is newly set or an operation for changing the previous setting condition, count of the number of the photographed subject images is cleared (S3). Accordingly, in a case where the date and time information is reset or changed since the power is turned on until the power is turned off, the number of the photographed subject images, which is counted until the date and time information is reset or changed, is cleared by the subject image number counting device and the number of the photographed subject images is newly counted from the next imaging.

When the photographing operation of the imaging apparatus is performed (S4), it is judged whether or not the date and time information is set by the date and time information setting device in the imaging apparatus (S5). If the date and time information is not set (S5: No), since the present date and time information obtaining device cannot obtain the date and time information and store the date and time information by associating the date and time information with the photographed subject image, the subject image number counting device cannot count the number of the photographed subject images up to the present time. Accordingly, in this embodiment, in a case where the date and time information is not set (S5: No), a count of the number of the photographed subject images is cleared by the subject image number counting device and the counting of the number of the photographed subject images is not performed (S6).

When it is judged that the date and time information is set (S5: Yes), it is judged whether or not the date and time information obtained by the present date and time information obtaining device and the last date and time information recorded by the last date and time information recording device are within the same day, that is, whether or not the present photographing operation is performed at the same day as the last (previous) photographing operation (S7). The last date and time information recording device stores the last date and time information (in this embodiment, at least date information) when last photographing the last subject image and update the last date and time information every time when a photographing operation is performed.

When it is judged that the last photographing operation is performed at a day different from the present photographing operation, that is, the present photographing operation is performed for a first time after the date is changed (S7: No), information on the stored number of the photographed subject images is cleared by the subject image number counting device (S8), and the number of the photographed subject image(s) is newly counted from a count "1" (S9).

On the other hand, when it is judged that the last photographing operation is performed at the same day as the present photographing operation (S7: Yes), since at least one photographing operation is performed within the same day, the number of the photographed subject images is counted (incremented) (S9).

When an operation for turning off the power (S10), the displaying unit obtains the counted number of the photographed subject images, which is stored at the time as subject image number information, and an operation for displaying the subject image number information on the liquid-crystal display monitor (displaying device) 4 (S11). Furthermore, when the date and time information is not set in the imaging apparatus, it is only necessary to display the number of photographed subject images as, for example, "0". After the number of the photographed subject images is displayed on the exit screen for a predetermined time (for example, 1 to 2 seconds), then the operation for turning off the power is completed.

As described above, the subject image number counting device may be configured not to count the number of photographed subject images and the displaying unit is configured to display the number of the photographed subject images as zero in a case where the date and time information is not set by the date and time information setting device. The subject image number counting device may be configured to reset and newly count the number of the photographed subject images in a case where the date and time information is newly set or reset by the date and time information setting device.

The photographing operation for counting a number of photographed subject images is not limited to the still image recording operation and may preferably be an operation by using a character recording function, a moving image recording function, a continuously-recording function, a plural size image simultaneously-recording function, a bracket function, a sound recording function, and the like. It is preferable for a user to select one of the above functions to count the photographed image in the photographing operation.

The display format on the exit screen is not limited to the above configuration and various display formats may be used to display the number of the photographed subject images (see FIGS. 5 and 6). In addition, it is preferable that the imaging apparatus includes a selecting device configured to select either to display or not to display the number of the photographed subject images on the exit screen.

As described above, according to the imaging apparatus of this embodiment, the last date and time information when last photographing a last subject image is stored and the present date and time information is compared with the last date and time information so as to be within the same day as each other. If the present date and time information is within the same day as the last date and time information, the number of the subject images photographed within the same day is cumulatively counted and the counted number is displayed when the power is turned off. Accordingly, the user is not required to perform operations other than the operation for turning off the power of the imaging apparatus when confirming the number of the photographed subject images so that the number of the photographed subject images can be easily confirmed.

In the above-described embodiment, it is described as an example that the subject image number counting device is configured to cumulatively count a number of photographed subject images within the same day and the cumulative counted number of the subject images photographed within the same day is displayed on an exit screen. In this case, the period for counting the number of the photographed subject images is not limited to that on a daily basis and in addition to or instead of the period of one day, periods of one day, periods of one week, one month and/or one year, and/or a period from the beginning of use to the present time, and the like may be preferably used so that various cumulative numbers of photographed subject images within various periods. That is, the predetermined period may be at least one of periods within a same day, a same week, a same month and a same year and a period from beginning of use to a present time. If two or more the predetermined periods are set, the subject image number counting device may be configured to count each of the number of the photographed subject images for each predetermined period.

Aside from the above-described embodiment, for example, in a case where the number of the subject images photographed within one week (second embodiment), it is possible to provide a storing area storing the cumulative number of the subject images photographed within the week. The week may, for example, be set to start on Sunday and end on Saturday.

The counting operation with a period of one week is the same as the counting operation with the period of one day. However, in the case where the counted number of the subject images photographed within one day is displayed, the counted number is cleared when the date is changed and it is judged that the photographing operation is performed for a first time (S7 to S9 in FIG. 4). On the other hand, in the case where the counted number of the subject images photographed within one week is displayed, for example, when it is judged that the date is changed and the photographing operation is performed for a first time as well as it is judged that the week is changed when the present photographing operation based on the date and time condition described-later from the date at one day of a week of the last photographing operation, the stored subject image number information for a week is cleared. Furthermore, the date and time condition from the date at one day of a week of the last photographing operation is, for example, a time to pass until the week changes or is updated, that is, if the last photographing operation is performed at Sunday, the time of 7 days or more is the condition for judging that the week changes or is updated. Similarly, if the last photographing operation is performed at Monday, Tuesday, Wednesday, Thursday, Friday, and Saturday, the time of 6 days or more, 5 days or more, 4 days or more, 3 days or more, 2 days or more, and 1 day or more, respectively. By performing the above processes, the number of the subject images within one week is not cleared for the period from Monday to Saturday.

According to such a configuration, it is possible to display the cumulative number of the subject images from the first photographing operation performed at a beginning of a week, for example, on Sunday. Therefore, the user can confirm the cumulative subject images from the beginning of the week when the power is turned off.

Furthermore, in a case where the number of the subject images photographed within one month (third embodiment), it is possible to provide a storing area storing the cumulative number of the subject images photographed within the month. The counting operation with a period of one month is the same as the counting operation with the period of one day. However, in the case where the counted number of the subject images photographed within one day is displayed, the counted number is cleared when the date is changed and it is judged that the photographing operation is performed for a first time (S7 to S9 in FIG. 4). On the other hand, in the case where the counted number of the subject images photographed within one month is displayed, for example, when it is judged that the month is changed and the photographing operation is performed for a first time, the stored subject image number information for one month is cleared.

By performing the above processes, the number of the subject images within one month is not cleared within the same month and the cumulative number of the subject images photographed within the month is displayed. Similarly, the number of the subject images photographed within one year may be preferably displayed.

Furthermore, in a case where the number of the subject images photographed from a beginning of use or since the imaging apparatus is activated for a first time until the present photographing operation (fourth embodiment), it is only necessary not to clear a number of subject images. It is possible to provide a storing area storing the cumulative number of the subject images photographed from the beginning of use, where the imaging apparatus is activated for a first time until the last photographing operation is performed. The cumulative number of the subject images is counted and updated every time when performing the photographing operation.

By performing the above processes, the cumulative number of the subject images from the beginning of use to the last photographing operation is displayed when the power is turned off.

In the aforementioned embodiments, the case where the number of the subject images photographed every week, month or year or from the beginning of use to the last photographing operation is counted is explained. However, a configuration in which another storing area (storing device) configured to store the number of the subject images photographed within the same day and an operating device configured to calculate numbers of the subject images photographed within for other predetermined time periods, for example, at least one of periods within a same week and a same month and a period from the beginning of use to the last photographing operation by reading out the number of the subject images photographed within the same day is provided to display the numbers of the subject images photographed within each period when the power is turned off.

Next, the display format for displaying a number of photographed subject images on the exit screen will be explained. The imaging apparatus may include, for example, a function of displaying a subject image number as one of setup functions to switch the display formats. The function of displaying a subject image number has some options such as periods on a daily basis, on a weekly basis, on a monthly basis and on one-year basis, a period in total, and the like as the display format and these options are selectably displayed. According to the selection of a user, the subject image number in the selected display format, that is, the number of subject images photographed within a period corresponding to the selected option may be displayed when the power is turned off.

Figure 5A:
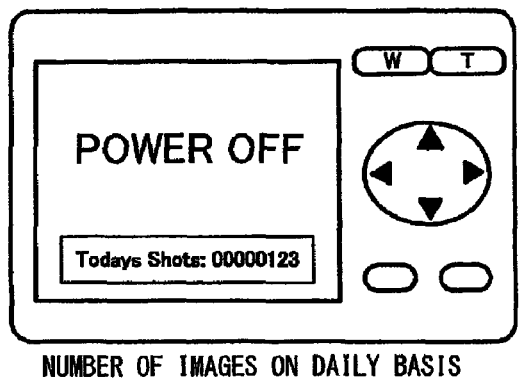
FIG. 5A is a schematic view illustrating an exit screen in which a number of photographed subject images on a daily basis is displayed on the displaying device of the imaging apparatus according to an embodiment of the present invention.
Figure 5B:
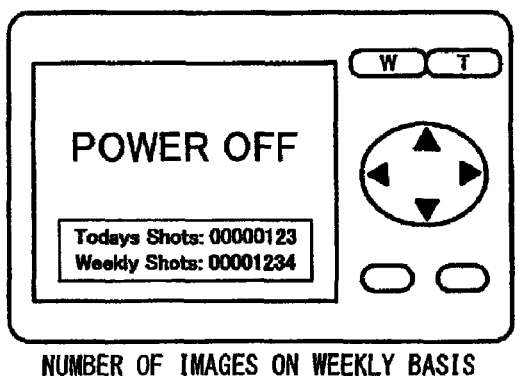
FIG. 5B is a schematic view illustrating an exit screen in which a number of photographed subject images on a weekly basis is displayed on the displaying device of the imaging apparatus according to an embodiment of the present invention.
Figure 5C:
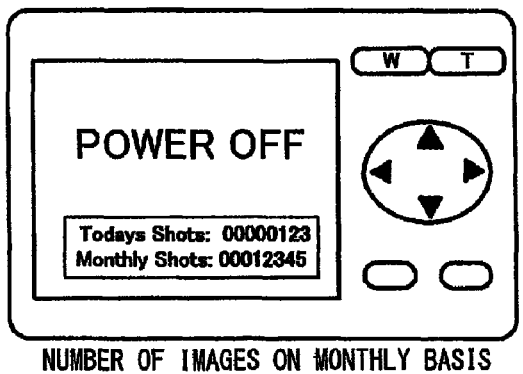
FIG. 5C is a schematic view illustrating an exit screen in which a number of photographed subject images on a monthly basis is displayed on the displaying device of the imaging apparatus according to an embodiment of the present invention.
Figure 5D:
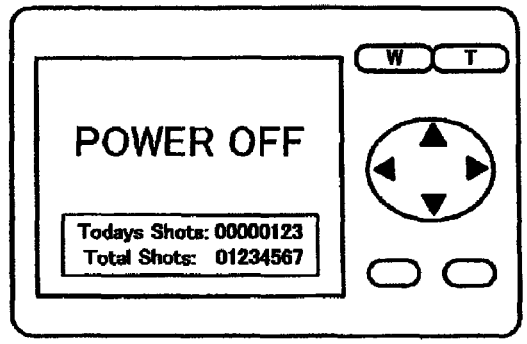
FIG. 5D is a schematic view illustrating an exit screen in which a number of photographed subject images from beginning of use to the present time is displayed on the displaying device of the imaging apparatus according to an embodiment of the present invention.

For example, in a case where the period within the same day is selected as the display format, the number of subject images photographed within the same day is displayed on the exit screen (see FIG. 5A). In a case where the period within the same week is selected as the display format, the number of subject images photographed within the same week is displayed on the exit screen (see FIG. 5B). In a case where the period within the same month is selected as the display format, the number of subject images photographed within the same month is displayed on the exit screen (see FIG. 5C). In a case where the period in total is selected as the display format, the cumulative number of subject images photographed from the beginning of use to the last photographing operation is displayed on the exit screen (see FIG. 5D). Furthermore, in FIGS. 5B to 5D, although the number of subject images photographed within a day is also displayed, it may not be displayed.

Figure 6A:
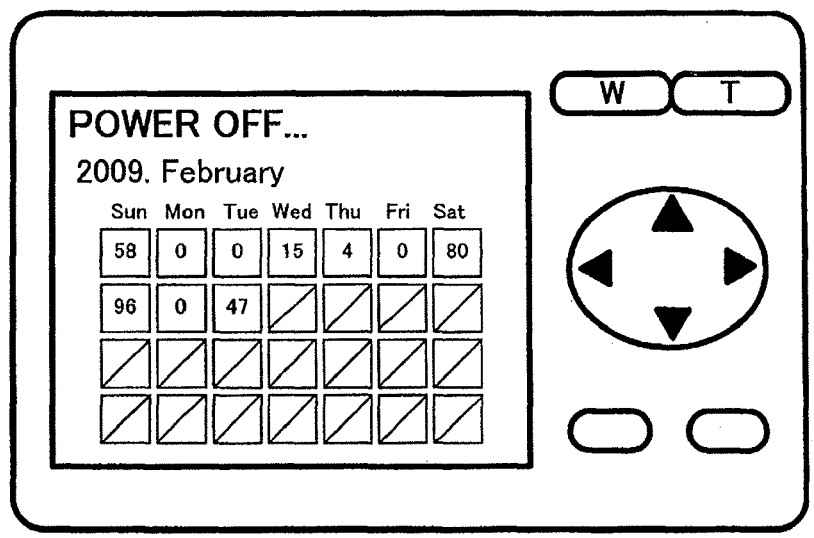
FIG. 6A is a schematic view illustrating an exit screen in which a calendar is displayed on the displaying device of the imaging apparatus according to an embodiment of the present invention.

The display format of the number of the photographed subject images on the exit screen is not limited to the display format for displaying only the number of the photographed subject images and may be various display formats. For example, as described above, by providing storing areas (31 areas) each for storing the number of the subject images photographed within a day, the subject image number information for each day can be stored in each storing area. Accordingly, it is preferable that for example, the numbers of the subject images photographed every day for one month are displayed by a calendar display as shown in FIG. 6A.

Figure 6B:
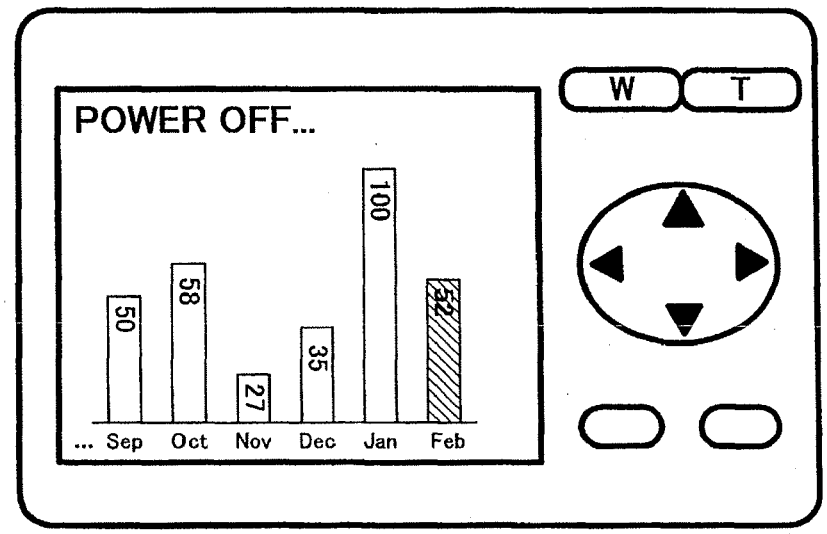
FIG. 6B is a schematic view illustrating an exit screen in which a graph is displayed on the displaying device of the imaging apparatus according to an embodiment of the present invention.

Furthermore, by providing storing areas (12 areas) each for storing the number of the subject images photographed within a month, the subject image number information for each month can be stored in each storing area. Accordingly, it is also preferable that for example, the numbers of the subject images photographed every month for a predetermined period (6 months in FIG. 6B) are displayed by a graph as shown in FIG. 6B.

According to an embodiment of the present invention, a user can easily confirm a number of photographed subject images when the power of the imaging apparatus is turned off.

Although the preferred embodiments of the present invention have been described, it should be understood that the present invention is not limited to these embodiments, various modifications and changes can be made to the embodiments.

What is claimed is:
1. An imaging apparatus, comprising:
a power control device configured to turn on or off the imaging apparatus;
a photographing operation performing device configured to perform a photographing operation when the imaging apparatus is turned on;
a counting device configured to count a number of data obtained by performing the photographing operations within a predetermined period; and
a displaying device configured to display the counted number of data on an exit screen which is displayed while the the imaging apparatus is being turned off.

2. The imaging apparatus according to claim 1, further comprising:
a date and time information obtaining device configured to obtain present date and time information at a time performing a present photographing operation; and
a last date and time information recording device configured to record last date and time information at a time performing a last photographing operation, wherein
the counting device is configured
to compare the present and last date and time information to judge whether or not the present date and time information is within the predetermined period from the last date and time information and
to count the number of obtained data if it is judged that the present date and time information is within the predetermined period from the last date and time information.

3. The imaging apparatus according to claim 1, wherein the predetermined period is at least one of periods within a same day, a same week, a same month and a same year and a period from beginning of use to a present time.

4. The imaging apparatus according to claim 1, wherein if two or more predetermined periods are set, the counting device is configured to count each of the number of obtained data for each predetermined period.

5. The imaging apparatus according to claim 1, wherein
two or more predetermined periods are set;
the two or more predetermined periods includes a period within a same day; and
the imaging apparatus further comprises:
a storing device configured to store the number of data counted by the counting device for each day, and
an operating device configured to calculate a number of data for another predetermined period, based on the number of data counted for each day.

6. The imaging apparatus according to claim 1, further comprising:
a storing device configured to store the number of data counted by the counting device for each day, wherein the displaying device is configured to display the counted number of the data for each day by a calendar display.

7. The imaging apparatus according to claim 1, wherein the displaying device is configured to display the counted number of data as a graph display.

8. An imaging apparatus, comprising:
a power control device configured to turn on or off the imaging apparatus;
a photographing operation performing device configured to perform a photographing operation when the imaging apparatus is turned on;
a counting device configured to count a number of data obtained by performing the photographing operations within a predetermined period; and
a displaying device configured to display the counted number of data when the imaging apparatus is turned off,
wherein if two or more predetermined periods are set, the counting device is configured to count each of the number of obtained data for each predetermined period.

9. An imaging apparatus, comprising:
a power control device configured to turn on or off the imaging apparatus;
a photographing operation performing device configured to perform a photographing operation when the imaging apparatus is turned on;
a counting device configured to count a number of data obtained by performing the photographing operations within a predetermined period; and
a displaying device configured to display the counted number of data when the imaging apparatus is turned off,
wherein two or more predetermined periods are set,
the two or more predetermined periods includes a period within a same day, and
the imaging apparatus further comprises:
a storing device configured to store the number of data counted by the counting device for each day, and
an operating device configured to calculate a number of data for another predetermined period, based on the number of data counted for each day.

* * * * *